United States Patent [19]

Ito et al.

[11] Patent Number: 4,515,066
[45] Date of Patent: May 7, 1985

[54] VACUUM ACTUATOR

[75] Inventors: Tosikazu Ito; Kiyomi Komathuzaki, both of Ibaraki; Kenichi Chonan, Katsuta; Kiyoshi Horibe, Hitachi, all of Japan

[73] Assignee: Hitachi, Ltd., Tokyo, Japan

[21] Appl. No.: 314,036

[22] Filed: Oct. 22, 1981

[30] Foreign Application Priority Data

Oct. 22, 1980 [JP] Japan ................................ 55-148718

[51] Int. Cl.$^3$ ........................................... F15B 13/044
[52] U.S. Cl. ....................................... 91/454; 91/459; 137/DIG. 8
[58] Field of Search ............... 137/DIG. 8; 91/6, 433, 91/454, 459, 275, 361; 92/94, 99

[56] References Cited

U.S. PATENT DOCUMENTS

| 2,566,642 | 9/1951 | Thomas ................................ 91/459 |
| 3,572,214 | 3/1971 | Woodward ............................ 92/94 |
| 4,281,586 | 8/1981 | Kuhlen et al. ........................ 91/459 |
| 4,284,261 | 8/1981 | Benjamin et al. ............ 137/DIG. 8 |

FOREIGN PATENT DOCUMENTS 2421320 11/1979 France ........................ 137/DIG. 8

Primary Examiner—Richard E. Schafer
Assistant Examiner—Richard Klein
Attorney, Agent, or Firm—Antonelli, Terry & Wands

[57] ABSTRACT

A vacuum actuator having a vacuum chamber and an atmospheric chamber separated from each other by means of a diaphragm, and an actuator rod connected at its one end to the diaphragm and extending across the atmospheric chamber to the outside of the actuator so as to be connected to an object to be actuated. An annular solenoid coil is mounted on the upper surface of the upper wall of the case defining the vacuum chamber, in such a manner that the axis of the solenoid coil extends substantially at a right angle to the axis of the actuator rod. A plunger disposed in the annular solenoid coil is adapted to be moved in one and the other directions along the axis of the annular solenoid coil. The end of the plunger is adapted to be moved into and out of a valve case in which is defined a control pressure chamber. A port for introducing a vacuum from a vacuum passage into the control pressure chamber and a port for introducing the atmospheric pressure into the same are formed in the valve case coaxially with each other. A valve member disposed between these ports is adapted to be displaced by the plunger so as to selectively open and close these ports. The pressurized fluid in the control pressure chamber is introduced into the vacuum chamber through a passage interconnecting the control pressure chamber and the vacuum chamber, thereby to produce a force which acts on the diaphragm.

8 Claims, 10 Drawing Figures

VACUUM ACTUATOR

BACKGROUND OF THE INVENTION

The present invention relates to a vacuum actuator and, more particularly, to a vacuum actuator having a vacuum control solenoid valve integrally fixed to the wall surface of a casing of the actuator.

It is known to integrally fix a vacuum control solenoid valve to the wall surface of an actuator. In the known vacuum actuators, however, a control pressure chamber for accomodating a valve member and a solenoid device for controlling said valve member are stacked in the axial direction of the actuator rod and on the upper surface of the case. Since the solenoid device having a considerable weight is disposed at an upper part of the actuator, the weight center or centroid of the vacuum actuator is positioned at a considerable distance from the mounting surface of the vacuum actuator, i.e. from the bottom surface of the vacuum actuator. Therefore, if the vacuum actuator is fixed to a portion subjected to a vibration, the solenoid device makes a rocking motion due to the vibration to impart a large repetitional force to the fixing portion of the vacuum actuator due to the inertia caused by the vibratory rocking motion, often resulting in a breakdown or loosening of the fixing portion.

The vibratory force due to the vibratory rocking of the solenoid device is applied also to the joint between the case of the actuator and the case of the valve, as well as to the joint between the valve case and the solenoid device, to cause a separation at these joints or cracking in the resin portion around these joints, resulting in various troubles such as a leakage of vacuum from the valve case, dropping of the solenoid device and so forth.

These problems are particularly serious in the case of vacuum actuators mounted on automobile engines due to the vigorous vibration inherent in these engines.

SUMMARY OF THE INVENTION

Accordingly, an object of the invention is to provide a vacuum actuator in which the centroid of the solenoid device is positioned as close as possible to the outer wall surface of the actuator to thereby overcome the above-described problems of the prior art.

To this end, according to the invention, the solenoid valve is fixed to the outer surface of the upper wall of the upper case of the actuator in such a manner that the axis of an annular solenoid constituting a part of the solenoid valve extends substantially at a right angle to the axis of the actuator rod.

The above and other objects, as well as advantageous features of the invention will become clear from the following description of the preferred embodiments taken in conjunction with the accompanying drawings.

DESCRIPTION OF THE PREFERRED EMBODIMENTS

Figure 1:
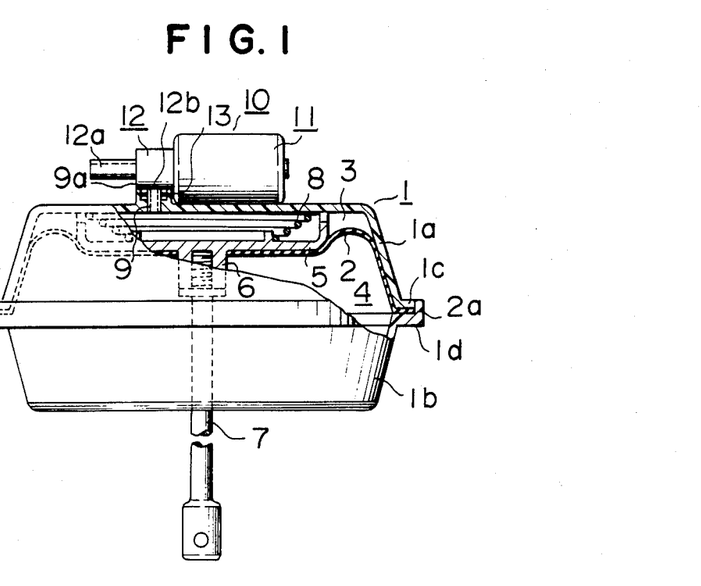
FIG. 1 is a partly sectioned front elevational view of a vacuum actuator constructed in accordance with an embodiment of the invention.

Referring now to the drawings wherein like reference numerals are used throughout the various views to designate like parts and, more particularly, to FIG. 1, according to this figure, a vacuum actuator includes a case generally designated by the reference numeral 1, made from a resin, with the case 1 including a bowl-shaped upper case 1a and a lower case 1b joined and united to each other along flanges 1c, 1d by, for example, fusion welding.

A diaphragm 2 has a peripheral flange portion 2a clamped in an airtight manner between the flanges 1c, 1d of the upper and lower cases 1a, 1b. Consequently, the space in the case 1 is divided into a first chamber 3, defined between the upper case 1a and the diaphragm 2, and a second chamber 4 defined between the diaphragm 2 and the lower case 1b.

A retainer plate 5 is attached to the surface of the diaphragm 2 adjacent to the upper case 1a. The retainer plate 5 is provided at its center with a boss 6 which projects into the second chamber 4 through the center of the diaphragm 2, but the retainer plate 5 is jointed to the diaphragm 2 in an airtight manner.

A rod 7 is threadably attached at one end to the boss 6, with the rod 7 extending at a right angle to the plane of the diaphragm 2 downwardly to the outside of the case 1 through a bottom of the lower case 1b.

A spring 8 acts between the retainer plate 5 and the inner surface of the upper case to thereby bias the diaphragm 2 toward the lower case 16.

A through hole 9 is formed in the top wall of the upper case 1a, with the through hole 9 being surrounded by an annular protrusion 9a formed on the upper case 1a to project outwardly therefrom.

A solenoid valve 10 is constituted by a solenoid portion generally designated by the reference numeral 11 and a valve case generally designated by the reference numeral 12 made of a resin. The valve case 12 is shaped to integrally have a vacuum input nipple 12a and a vacuum output nipple 12b projecting therefrom at a right angle to each other. More specifically, the vacuum input nipple 12a extends in parallel with the upper wall of the upper case 1a, while the output nipple 12b extends at a right angle to the upper wall of the upper case 1a. The output nipple 12b has an end received by the through hole 9.

The upper end of the annular protrusion 9a is closed by means of the bottom surface of the valve case 12. A seal ring 13 is interposed between the annular protrusion 9a and the output nipple 12b to prevent the first chamber 3 from being communicated with the atmosphere through the through hole 9.

Figure 2:
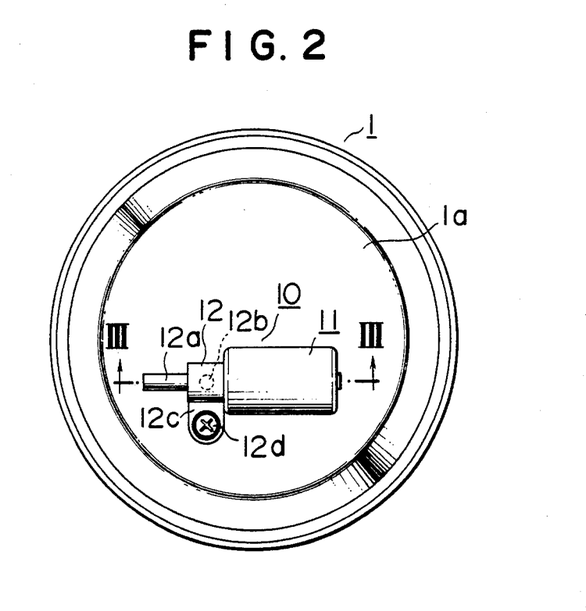
FIG. 2 is a plan view of the vacuum actuator shown in FIG. 1.

As shown in FIG. 2, the valve case 12 is provided with a flange 12c integral therewith, and is fastened to the upper case 1a at the flange 12c by means of screws. The solenoid valve 10 is fixed to the upper case 1a as the flange 12c is fastened by the screws 12d.

Figure 3:
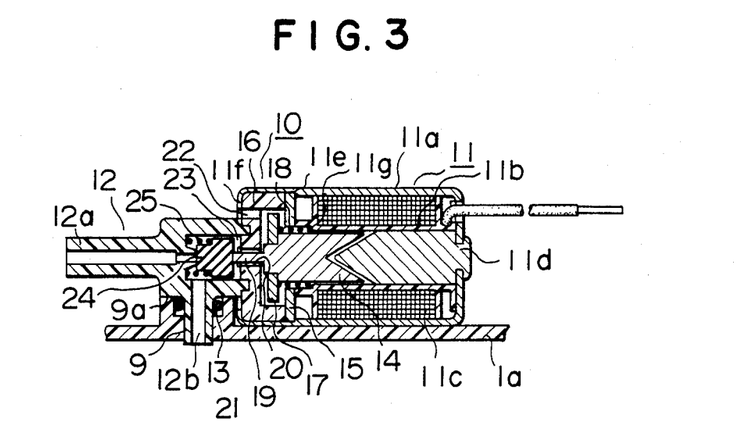
FIG. 3 is a sectional view taken along the line III—III of FIG. 2.
Figure 4:
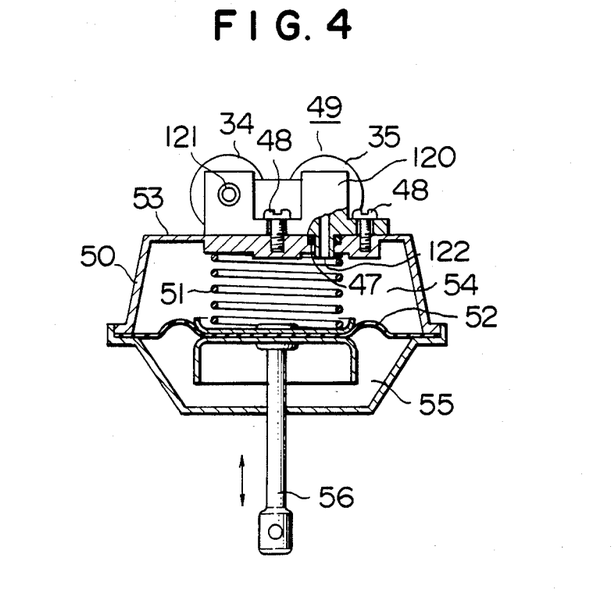
FIG. 4 is a partly sectioned front elevational view of a vacuum actuator constructed in accordance with another embodiment of the invention.
Figure 5:
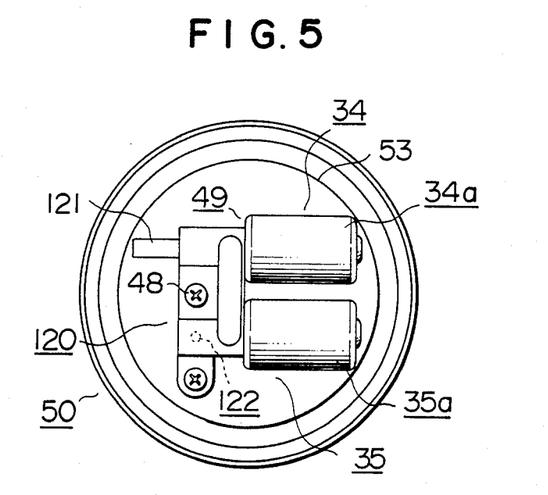
FIG. 5 is a plan view of the vacuum actuator shown in FIG. 4.
Figure 6:
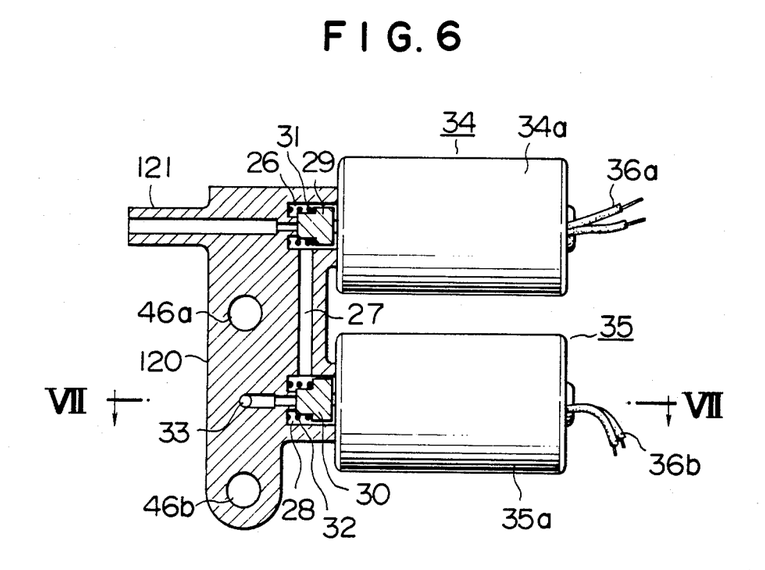
FIG. 6 is a partly sectioned enlarged view of a solenoid valve unit as shown in FIG. 5.

As shown in FIG. 3, the outer configuration of the solenoid 11 is constituted by a bottom-equipped cylindrical case 11a of a magnetic material. The case 11a receives a solenoid coil 11c having a cylindrical bobbin 11b of resin and a wire wound around the bobbin 11b.

A pole yoke 11d, having one end fixed to the bottom of the case 11a and a conically shaped other end, is fixed to the center of the coil bobbin 11b. A plunger 14, made of a magnetic material loosely fitted to the center of the bobbin 11b, has a conical recess corresponding to the conical end of the pole yoke 11d. The end of the bobbin 11b adjacent to the plunger 14 has an annular yoke plate 15 made of a magnetic material. The yoke plate 15 makes a contact at a peripheral edge thereof with a step 11e formed along the inner peripheral surface of the case 11a. A bowl-shaped bottom-equipped cover 16 is made of a resin and makes a contact at an open end thereof with the brim of the end of the yoke 15 opposite to the bobbin 11b.

The arrangement is such that the yoke plate 15 is pressed against the step 11e while the bobbin 11b is pressed onto the inner bottom surface of the case 11a as the peripheral edge of the end of the cover 16 opposite to the yoke 15 is caulked together with the opening brim 11f of the case 11a.

An annular movable yoke plate 17, made from a resin, is fixed to the plunger 14 and is disposed in the space formed between the cover 16 and the yoke plate 15. A spring 18, for biasing the movable yoke 17 away from the bobbin 11b is disposed to act between the end surface of the movable yoke plate 17 adjacent to the bobbin 11b and a step 11g formed on the inner peripheral surface of the bobbin 11b. A pin 19, having a small diameter and attached to the end of the plunger 14 remote from the bobbin, extends through the movable yoke plate 17. The pin 19 extends further to the outside of the cover 16 through a through hole 20 formed at the center of the cover 16. An annular ridge 21 formed on the end of the valve case 12 is welded to the cover 16 so as to concentrically surround the through hole 20.

A port 22, formed in the outer peripheral portion of the valve case 12 welded to the cover 16, communicates with the space between the cover 16 and the yoke plate 15 across the cover 16. Thus, the port 22 provides a communication between the control pressure chamber 23 formed in the valve case 12 and the atmosphere, through the space between the cover 16 and the yoke plate 15 and then through the through hole 20. One end of the vacuum input nipple 12a, formed integrally with the valve case 12, opens to the control pressure chamber 23 at a position confronting the through hole 20.

Valve seats are formed on the open end of the vacuum input nipple 12a confronting the control pressure chamber 23 and on the open end of the through hole 20. A valve member 24, made of rubber, is disposed between the valve seats so as to move therebetween to make a selective engagement with these valve seats.

The valve member 24 is normally biased toward the through hole 20 by the force of a spring 25. However, insofar as the solenoid coil 11c is de-energized, the valve member 24 is pressed toward the vacuum input nipple by the pin 19 on the end of the plunger 14, due to the force of the spring 18 which acts to press the plunger 14 toward the vacuum input nipple 12a.

As stated before, one end of the output nipple 12b communicates with the first chamber 3 in the upper case 1a through the through hole 9, while the other end opens to the control pressure chamber 23. Therefore, as long as the solenoid coil 11c is kept de-energized, the atmospheric pressure is transmitted to the first chamber 3 of the actuator through the control pressure chamber 23 and then through the output nipple 12b. Consequently, as the pressure in the first chamber approaches the atmospheric pressure, the diaphragm 2 is biased by the spring 8 toward the second chamber 4 so that the actuator rod 7 is forcibly moved downwardly as viewed in the drawings.

To the contrary, as the solenoid coil 11c is energized, the plunger 14 is magnetically attracted by the pole yoke 11d overcoming the force of the spring 18, so that the valve member 24 closes the through hole 20 while opening the opened end of the vacuum input nipple 12a to permit the introduction of the vacuum into the control pressure chamber. Consequently, the vacuum is transmitted to the first chamber 3 through the output nipple 12b to act on the diaphragm 2 to pull back the latter toward the first chamber 3 overcoming the force of the spring 8 to lift the actuator rod 7 upwardly as viewed in the drawings.

A vacuum actuator of a second embodiment has, as shown most clearly in FIGS. 4–7 two solenoid valves 34, 35 having independent solenoids 34a, 35a and a common valve case 120, with each solenoid 34a, 35a, having a construction identical to the solenoid shown in FIG. 3. The valve case 120 and the solenoids 34a, 35a are assembled together to form a unit and the case 120 is secured by means of screws 48 to the upper surface of the actuator case 53 in such a manner that the output nipple 122 of the solenoid valve 35 is communicated, through an "O" ring 47, with a first chamber 54 formed in the actuator case 53. The vacuum actuator 50 has a diaphragm 52 which separates the vacuum chamber (first chamber) 54 from the atmospheric chamber (second chamber) 55. A spring 51 for pressing the diaphragm 52 toward the atmospheric chamber 55 is disposed in the vacuum chamber 54. An actuator rod 56 is fixed at its upper end to the lower surface of the central portion of the diaphragm 52. The valve case 120 has a vacuum input nipple 121 communicating with a vacuum source and an output nipple 122 constituting a signal passage 33. The nipples 121 and 122 are in communication with each other through the control pressure chamber 26, communication passage 27 and the control pressure chamber 28. The control pressure chamber 26 accommodates a valve member 29 made of rubber and a coiled spring 31, while the control pressure chamber 28 accommodates a valve member 30 and a spring 32. These control pressure chambers 26 and 28 are in communication with atmospheric ports 45a, 45b through passage ports formed in the ends of the plungers 40a, 40b and then through the space in the cover 44.

Figure 7:
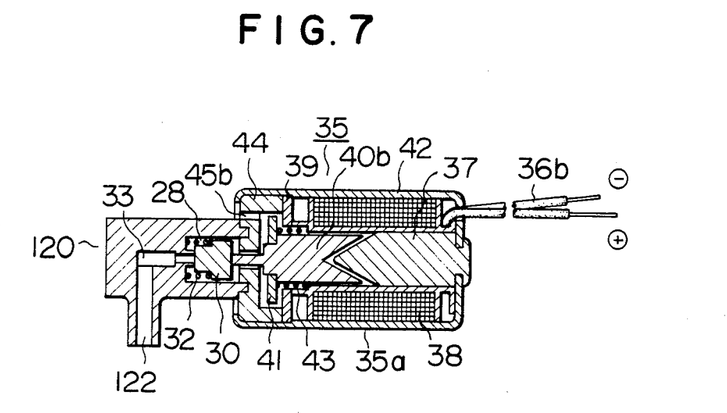
FIG. 7 is a sectional view taken along the line VII—VII of FIG. 6.

As will be seen from FIG. 7, each solenoid has a pole yoke 37 having an end projected to the center thereof, and a plunger 40a (40b) having a conical recess confronting the projected end of the pole yoke. The peripheral portion of the pole yoke 37 is surrounded by a solenoid coil 38 which, in turn, is surrounded by a yoke plate 39 and a case 42 made of a magnetic material. A yoke plate 41 also made of a magnetic material is fixed to the left portion of the plunger 40b (40a) so as to oppose to the yoke plate 39. A spring 43, wound around a plunger 40b (40a), is disposed between the movable yoke plate 41 and the left end surface of the solenoid coil 38.

The solenoids 34a, 35a are arranged such that the ends of the plungers 40a, 40b extend through covers 44 into the control pressure chambers 26, 28 of the valve case 120. The covers 44 are welded to the valve case 120 to integrate the solenoids 34a, 35a with the valve case 120.

FIG. 7 shows the state in which the solenoid coil 38 of the solenoid 35a is not supplied with the electric current. In this state, the end of the plunger 40, pressed by the spring 43, urges the valve member 30 to make the latter close the signal passage 33, so that the atmospheric pressure is maintained in the control pressure chamber 28. Then, as the electric current is supplied to the solenoid coil 38 through the lead lines 36b, the plunger 40 is attracted by the pole core 37 to open the signal passage 33 to transmit the vacuum or the atmospheric pressure in the passage 27 through the signal passage 33 as the output. The valve case 120 has threaded mounting holes 46a, 46b for mounting the solenoid valves 34, 35 on the actuator 50.

Figure 8:
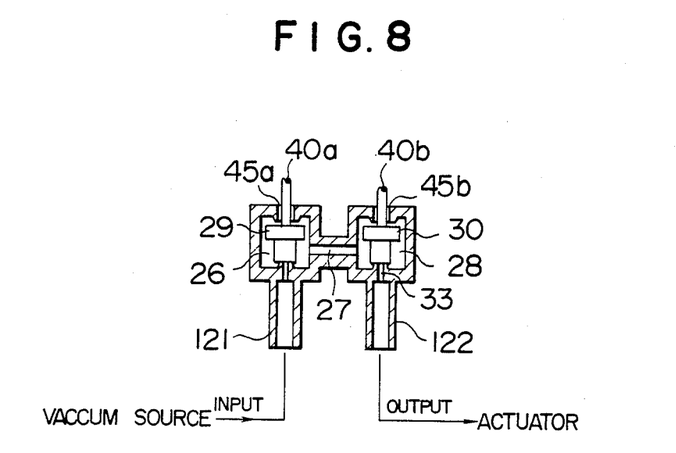
FIG. 8 is a schematic illustration showing the principle of operation of the vacuum actuator shown in FIG. 7.

As shown in FIG. 8, while the solenoid coil 38 of the solenoid 34a, 35a is not energized, the vacuum input nipples 121 are disconnected from the output nipples 122 by respective valve members 29, 30, so that the output nipples 122 deliver no output signal. When only the solenoid 35a is energized, the valve member 30 is moved to open the output nipple 122, so that the atmospheric pressure introduced from the atmospheric port 45a of the control pressure chamber 26 is transmitted to the first chamber 54 of the actuator 50. When both of the solenoids 34a, 35a are energized, the vacuum introduced through the vacuum nipple 121 is transmitted from the output nipple 122. This operation will be well understood from Table 1 showing how the state of output from the output nipple is changed in accordance with the change in the states of coils.

TABLE 1

| States of coils | 1 | 2 | 3 |
|---|---|---|---|
| solenoid 34a | de-energized | de-energized | energized |
| solenoid 35a | de-energized | energized | energized |
| output signal from output nipple 122 | no output | Atmospheric pressure | vacuum |

Thus, according to this embodiment, it is possible to transmit the vacuum signal to the first chamber 54 of the actuator as desired in a controlled manner by suitably controlling the operation of a pair of solenoids 34a, 35a. Namely, in the vacuum actuator of this embodiment, it is possible to control the pressure in the vacuum chamber (first chamber 54) by selectively energizing the solenoid 34a, 35a coils of a combination of a pair of solenoids, to thereby selectively move the actuator rod 56 back and forth.

Figure 9:
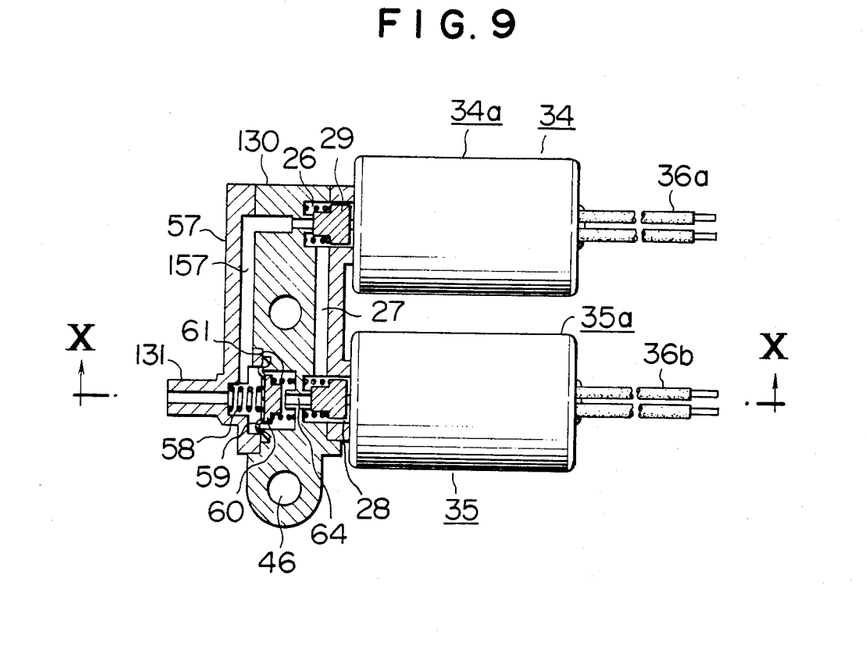
FIG. 9 is a partial sectional view of another example of the solenoid valve unit shown in FIGS. 6 and 7.
Figure 10:
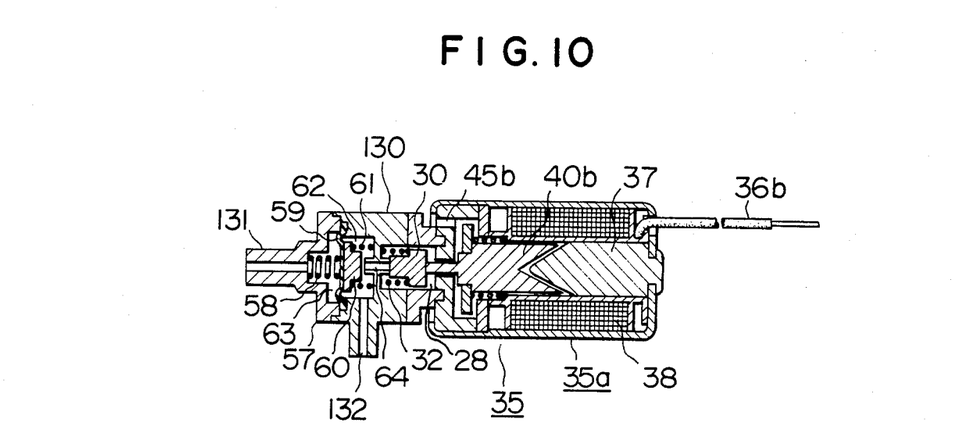
FIG. 10 is a sectional view taken along the line X—X of FIG. 9.

A vacuum actuator in FIGS. 9 and 10 incorporates a mechanism adapted to shut off an output nipple 132 when the level of the vacuum introduced through an vacuum input nipple 131 comes to take a level closer to the atmospheric pressure than the vacuum transmitted through the output nipple 132, to thereby prevent any erroneous operation of the vacuum actuator due to a reduction in the vacuum of the vacuum source.

More specifically, the vacuum input nipple 131 is formed in a valve cover 57 to take a position on the extension of the central axis of the plunger of the solenoid 35a, and is communicated with the control pressure chamber 26 through a passage 157 formed in the valve cover 57. A valve member 30 and a spring 32 are accommodated by the control pressure chamber 28 which is communicated with another control pressure chamber 62 through a passage 64. The control pressure chamber 62 accommodates a valve member 60 and a spring 61 and is communicated with a signal passage of the output nipple 132. A small diaphragm 59 is disposed between the control pressure chamber 62 and the vacuum chamber 63 which accommodates a spring 58 for setting the operating pressure of the diaphragm 59.

The second valve member 30, passage 64, third valve member 60 and the pressure setting spring 58 are arranged in series along the central axis of the plunger 40b in the mentioned order.

In the vacuum actuator having the described construction, the valve member 60 is moved to the left together with the diaphragm 59 to open the passage 64, as the vacuum is introduced into the vacuum chamber 63 through the vacuum input nipple 131. As the coils 38 of the solenoids 34a, 35a are energized in this state, the vacuum introduced through the vacuum input nipple 131 is delivered through the control pressure chamber 26, passage 27 and the control pressure chamber 28 to the output nipple 132 so as to be transmitted from the latter as a vacuum signal. The pressure setting spring 58 then deflects the diaphragm 59 to the right to urge the valve member 60 in the direction to block the passage 64. The spring 61 contacting the valve member 60, urges the valve member 60 in cooperation with the diaphragm 59. Therefore, if the valve member 60 is fixed to the diaphragm 59, the spring 61 can be omitted.

The vacuum actuator of FIGS. 9 and 10 functions to prevent erroneous operation of the diaphragm 52 of the actuator 50. Namely, when a predetermined vacuum is reached in the vacuum chamber 54 of the actuator 50, i.e. when the pressure in the vacuum chamber 54 becomes lower than the pressure in the vacuum chamber 63, the small diaphragm 59 urges the valve member 60 to block the passage 64 to interrupt the further introduction of the vacuum. Consequently, when the level of the vacuum in the vacuum source is lower than the vacuum demanded by the solenoid valve, the communication between the vacuum source and the vacuum chamber of the actuator is broken to prevent backward transmission of vacuum from the vacuum chamber to the vacuum source to thereby avoid the deflection of the actuator diaphragm 59 in the direction reverse to the desired direction of deflection.

As has been described, according to the invention, the annular solenoid coil of the solenoid valve is fixed to the outer surface of the upper wall of the upper case in such a manner that the axis of the coil extends substantially at a right angle to the axis of the actuator rod. Accordingly, it is possible to position the centroid of the solenoid valve sufficiently close to the upper wall of the actuator to avoid any accidental separation in the joints between the solenoid valve and the actuator and between the solenoid of the solenoid valve and the valve case, as well as cracking in the resin around these joints, which are often experienced in the conventional vacuum actuators due to the vibratory force generated by the inertia when the vacuum actuator is subjected to a vibration. Consequently, the undesirable leak of the vacuum and dropping of the solenoid valve from the actuator are eliminated to ensure a longer life and safe operation of the vacuum actuator. In addition, since the centroid of the actuator as a whole can be positioned closer to the bottom wall of the lower case at which the actuator is mounted than in the conventional vacuum actuators, the loosening of the fixing portion of the actuator and the dropping of the actuator are advantageously avoided.

We claim:

1. A vacuum actuator comprising:
   a diaphragm chamber defined between a diaphragm and an acutator case means for housing said diaphragm;
   an actuator rod means for transferring a displacement of said diaphragm;
   a valve member for controlling a communication of vacuum with said diaphragm chamber;
   solenoid means for actuating said valve member, said solenoid means being mounted on an outer surface of said actuator case and includan annular solenoid coil, a plunger means for displacing said valve member under an electromagnetic force caused by said solenoid coil and a cylindrical case means made of magnetic material for receiving said solenoid coil;
   a valve case means for forming a part of a vacuum passage and for housing said valve member therein, said valve case means comprises a first valve chamber housing said valve member, a vacuum inlet port for introducing vacuum to said first valve chamber, an atmosphere inlet port opening at an opposite side of said first valve chamber from said valve inlet port for introducing atmosphere to said first valve chamber, a second valve chamber housing a second valve member, a communication passage between said first valve chamber and said second valve chamber, and a vacuum outlet nipple for introducing vacuum from said second valve chamber to said diaphragm;
   means for releasably securing said solenoid means to said actuator case means in such a manner that an outer surface of said cylindrical case means of said solenoid means is in contact with an outer surface of said actuator case means and said valve case means is disposed on said outer surface so as to enable a completion of said vacuum passage; and
   wherein said solenoid means comprises a first solenoid portion secured to said valve case means for selectively controlling the first mentioned valve member to open and close the vacuum inlet port, and a second solenoid portion secured to said valve case means for selectively controlling said second valve member to open and close said vacuum outlet nipple.

2. A vacuum actuator as claimed in claim 1, further comprising a first spring means for biasing said first mentioned member toward said atmosphere inlet port, a second spring means stronger than said first spring means for biasing said first mentioned valve member toward said vacuum inlet port through said plunger so that said first mentioned valve member is biased so as to close said vacuum inlet port when the solenoid coil is denergized, a third spring means for biasing said second valve member away from said vacuum outlet nipple, and a fourth spring means stronger than said third spring means for biasing said second valve member toward said vacuum outlet nipple through a second plunger so that said second valve member is biased so as to close said vacuum outlet nipple when a second solenoid coil of said second solenoid portion is denergized.

3. A vacuum actuator as claimed in claim 1, wherein said valve case means further comprises valve means actuated by a pressure difference between a pressure in said vacuum inlet port and a pressure in said vacuum outlet nipple so that when said pressure in said vacuum inlet port approaches an atmospheric pressure said vacuum outlet nipple is closed.

4. A vacuum actuator comprising: a case having a bowl-shaped upper case and a bowl-shaped lower case which are joined to each other at their peripheral edges; a diaphragm having a peripheral edge clamped between said peripheral edges of said upper and lower cases in an air tight manner; a closed pressure chamber defined between said diaphragm and said upper case; an atmospheric chamber defined between said diaphragm and said lower case; an actuator rod connected at one end to said diaphragm and extending downwardly to an outside of said case across said atmospheric chamber and through the bottom wall of said case substantially at a right angle to the latter; a spring disposed in said vacuum chamber and adapted to by-pass said diaphragm toward the bottom wall of said lower case; a first annular solenoid coil mounted on an outer surface of an upper wall of said upper case in such a manner that an axis of said solenoid coil extends substantially at a right angle to said actuator rod; a first plunger movable in one end the other directions along the axis of said solenoid coil; a first valve member adapted to be moved between opening and closing positions by said plunger; a valve case having a first control pressure chamber accommodating said valve member; a first passage providing a communication between said first control pressure chamber in said valve case and said closed pressure chamber in said case; a vacuum passage and an atmospheric passage adapted to be selectively opened and closed by said valve member to introduce either a vacuum or atmospheric pressure into said first control pressure chamber; a second control pressure chamber disposed at an intermediate portion of said vacuum passage for supplying vacuum to said first control pressure chamber from a vacuum source; a vacuum introduction port through which the vacuum is inroduced into said second control pressure chamber from said vacuum source; a second annular solenoid coil mounted on the outer surface of the upper wall of said upper case in such a manner that the axis of said second solenoid coil extends substantially at a right angle to said actuator rod; a second plunger movable in one and the other directions along the axis of said second solenoid coil; and a second valve member disposed in said second control pressure and adapted to be moved by said second plunger to open and close said vacuum introduction port.

5. A vacuum actuator as claimed in claim 4, wherein said second control pressure chamber is formed in said valve case together with said first control pressure chamber, said control pressure chambers being communicated with each other through a communication passage formed in said valve case.

6. A vacuum actuator as claimed in claim 4, further comprising a third pressure chamber disposed in said first passage providing the communication between said first control pressure chamber and said closed pressure chamber, and a third valve member disposed in said third control pressure chamber, said third valve member being adapted to be displaced in accordance with